United States Patent
Zeller

4,059,341

Nov. 22, 1977

[54] ELECTROCHROMIC DISPLAY DEVICE WITH ELECTROLYTES AND A METHOD OF PRODUCING THE SAME

[75] Inventor: Hans-Rudolf Zeller, Birr, Switzerland

[73] Assignee: BBC Brown, Boveri & Company, Limited, Baden, Switzerland

[21] Appl. No.: 673,160

[22] Filed: Apr. 2, 1976

[30] Foreign Application Priority Data

May 7, 1975 Switzerland .......................... 5866/72

[51] Int. Cl.² ................................. G02F 1/16
[52] U.S. Cl. ................................. 350/160 R
[58] Field of Search ............. 350/160 R; 340/172 LT, 340/324 M

[56] References Cited

U.S. PATENT DOCUMENTS

| | | | |
|---|---|---|---|
| 3,839,857 | 10/1974 | Berets et al. ..................... | 350/160 R |
| 3,843,232 | 10/1974 | Berets ............................. | 350/160 R |

*Primary Examiner*—William L. Sikes
*Attorney, Agent, or Firm*—Oblon, Fisher, Spivak, McClelland & Maier

[57] ABSTRACT

An improved electrochromic display device and a method of making it are disclosed. The display device includes a proton free substance used as the electrolyte which increases the lifetime of the display, even at high switching voltages. The disclosed method includes the initial dehydration of the electrolyte material and the subsequent addition of a drying agent to it.

9 Claims, 1 Drawing Figure

U.S. Patent
Nov. 22, 1977
4,059,341
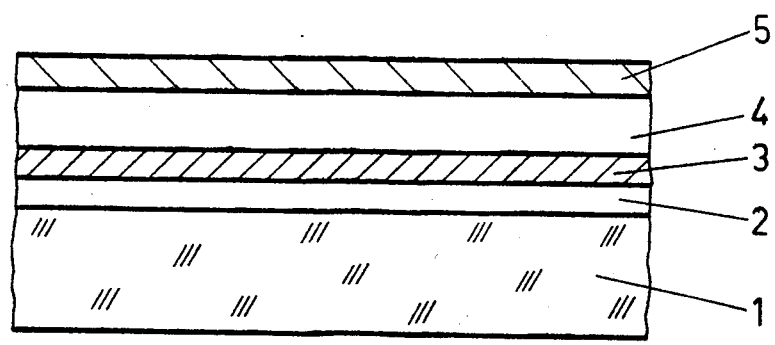
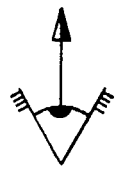

ELECTROCHROMIC DISPLAY DEVICE WITH ELECTROLYTES AND A METHOD OF PRODUCING THE SAME

BACKGROUND OF THE INVENTION

1. Field of the Invention:

The present invention relates to an electrochromic display device wherein an electrochromic layer present in solid form upon an electrode is in contact with an electrolyte, and to a method of producing the same.

2. Description of the Prior Art:

Display devices of the above-mentioned type are already known from the German published specifications Nos. 2,125,337; 2,201,104; 2,201,139 and 2,363,306. Such display devices contain as an essential constituent a cell of laminated structure to be controlled electrically which, in a particularly simple form of construction, exhibits on the side confronting the observer a glass plate upon which a transparent electrode made of tin dioxide is applied, which is adjoined by an electrochromic layer of tungsten or molybdenum trioxide, an electrolytic liquid layer, possibly a glycol-sulphuric acid mixture, and a further, preferably metallic, electrode. Under the influence of an electric field, the liquid electrolyte which is in direct contact with the electrochromic layer causes a rapid and uniform modification of the absorption characteristic in large areas of the electrochromic material and thus permits a rapid and uniform indication. A coloration occurs as a colored film on the electrode. The chromoactive ions of the electrochromic layer therefore do not pass into solution, but remain in the solid electrochromic layer. However, the short switching times which are necessary for a rapid indication are only achieved by applying a relatively high service voltage (U > 2V) to the cell electrodes, whereby the operational reliability and service life of the indicating devices are considerably reduced with a simultaneous undesirable increase in the energy consumption.

SUMMARY OF THE INVENTION

It is therefore one object of the present invention to develop a novel electrochromic display device.

Another object of the present invention is the development of a novel electrochromic display device having longer service life and shorter switching times than previously known devices.

A still further object of the present invention is the provision of a novel method of producing an electrochromic display device.

Briefly, these and other objects of the present invention are achieved in accordance with the teachings of the present invention by the use of a proton free substance as the electrolyte in an electrochromic display device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIGURE is a sectional illustration of the electrochromic cell of the invention.

DESCRIPTION OF THE PREFERRED EMBODIMENTS

The method of production according to the invention is characterized by the fact that all the initial substances contained in the electrolyte are dehydrated and a drying medium is admixed with the electrolyte.

Display devices of the type disclosed herein can be operated with voltages in excess of 2V without the useful life being reduced. Even after several cycles each of $10^6$ switchings of the device, when the display device was operated with the above-mentioned voltages, no loss of contrast was observed on the indicating surface, while by stepping up the voltage, e.g. to 5V, quite a considerable reduction of the switching time occurred.

A display device, the electrolyte of which includes a drying medium, has a very long service life because such a drying medium fixes any water which may possibly be present in or enter the electrolytes, and in this way the formation of protons in the electrolyte is inhibited. Anhydrous salt solutions, which preferably contain a hygroscopic alkali salt, have been found particularly satisfactory as an electrolyte.

Further particulars of the invention will emerge from the exemplary embodiment illustrated in the accompanying drawing and described in more detail hereinbelow.

Referring now to the FIGURE, the reference numerals designate a transparent support plate 1, a first electrode 2, an electrochromic layer made of tungsten trioxide 3, an electrolyte 4 and a second metallic electrode 5.

Glass is employed as the support plate 1, although other transparent materials, e.g. transparent plastics, are also suitable for this purpose. The electrode 2 applied on the glass support plate 1 consists of a tin dioxide-indium oxide mixture ($SnO_2 - In_2O_3$), is transparent and exhibits a thickness of a few $\mu$. The electrochromic layer 3 of tungsten trioxide is approximately $5\mu$ thick and is colorless before a direct voltage is connected to the electrodes 2 and 5. The layer 3 is applied most easily by vaporization in a high vacuum at approximately 1200° C.

The following 100–500 $\mu$ thick electrolyte layer 4 is in contact both with the electrochromic layer 3 and with the counter-electrode 5 made of metal, e.g. Pb, Au or Ag. The spacing between the support plate 1 with the applied layers 2 and 3 and the counter-electrode 5 is effected by foils not shown in the drawings, and sealing is effected with an epoxide resin adhesive.

As the electrolyte 4, a proton-free substance is introduced in a vacuum with the aid of a hypodermic needle into the cell previously made anhydrous by vacuum heating.

The use of a proton-free substance as the electrolyte of an electrochromic display device is based on the discovery that the following reaction causes coloration process of the electrochromic layer, e.g. of the tungsten trioxide ($WO_3$) layer 3:

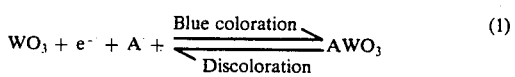

$$WO_3 + e^- + A^+ \underset{\text{Discoloration}}{\overset{\text{Blue coloration}}{\rightleftarrows}} AWO_3 \quad (1)$$

Here A = H+ or mixtures of H+ and other cations such as Li+, NH4+, and the reaction takes place without side reactions only at low voltages. At voltages above 1.6 V however, the following reaction occurs:

$$H^+ + e^- \rightarrow H° \qquad (2)$$

Nascent hydrogen is therefore formed which corrodes the electrodes 2, 5, as may be detected from the formation of gas bubbles in the cell. The reaction (2) is suppressed by the use of a proton-free electrolyte, so that consequently the reaction (1) occurs reversibly — i.e. with no side reactions, even at voltages above 1.6 V, and in this way the switching times are considerably reduced, while simultaneously the useful life of the cell is still noticeably higher, even for very short switching times, i.e. high voltages.

The electrolyte 4 is produced from carefully dried initial substances with the exclusion of air, and it should be particularly ensured that no constituents containing acid are used.

In a first exemplary embodiment, approximately 0.1-1 molar solutions of lithium perchlorate ($LiClO_4$) in propylene carbonate are filled by means of a hypodermic syringe into the cell which has been made anhydrous at over 100° C in a vacuum furnace. The propylene carbonate used is previously rendered as anhydrous as possible by distillation and is afterwards dried through a molecular sieve in order to remove the residual water fraction. The undesired water fraction of the lithium perchlorate is removed by heating for several hours in a vacuum furnace to a few ° C below the decomposition temperature, i.e. to approximately 120° C. The anhydrous electrolyte is kept dry before being filled into the display device by the addition of metallic lithium chips.

The anhydrous lithium perchlorate now fulfills two functions in the electrolyte. On the one hand it fixes as a drying medium any residues of water which may possibly still be present in the electrolyte or in the cell, so that proton formation in the electrolyte is prevented, but on the other hand it also produces by dissociation the conductivity of the electrolyte, in which the $Li^+$ ions necessary for the colouration reaction (1) are now available.

A cell filled with an above-mentioned 1-molar electrolyte solution of the above-described type exhibits a switching time of 100-200 ms at a voltage of 5V and can also perform several $10^6$ switching cycles at voltages above 5V without the formation of gas bubbles occurring and/or an appreciable loss of contrast being observable on the indicating surface.

In a second embodiment of the invention, a 0.1-1 mol lithium chloride (LiCl) containing propylene carbonate solution is used. For this purpose the lithium chloride, which is insoluble in propylene carbonate, is brought into solution by complexing with one of the following complex-forming agents: aluminium chloride, ethylene diamine tetra acetic acid and N,N,N'N'-tetramethyl ethylene diamine. In this case all the initial substances are carefully dried similarly to the first exemplary embodiment.

Besides propylene carbonate, other organic solvents such as dimethyl formamide, dimethyl sulphoxide, butyrolacetone, tetrahydrofuran, acetonitrile and 1,2-dimethoxyethane may also be used advantageously, either independently or in mixtures together. Besides the alkali salts mentioned, other hygroscopic salts, for example special earth alkali salts such as $CaCl_2$, may also be contained in the electrolyte. Besides molecular sieves, silica gel is also suitable as a drying medium for the organic liquids.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an electrochromic display device having an electrochromic layer present in its solid form upon a first electrode and in contact with a water-free electrolyte contacting a second electrode, the the improvement comprising:
    a proton-free substance as said electrolyte and an operating voltage between said two electrodes exceeding two volts.
2. A display device as in claim 1, wherein:
    said electrolyte includes a drying medium.
3. A display device as in claim 1, wherein:
    said electrolyte is an anhydrous salt solution of at least one hygroscopic alkali salt.
4. A display device as in claim 3, wherein:
    said electrolyte contains lithium chloride as an alkali salt, and a solvent from the group consisting of propylene carbonate, dimethyl formamide, dimethyl sulphoxide, butyrolacetone, tetrahydrofuran, acetonitrile and 1,2-dimethoxyethane.
5. A display device as in claim 3, wherein:
    said electrolyte contains lithium perchlorate as an alkali salt, and a solvent from the group consisting of propylene carbonate, dimethyl formamide, dimethyl sulphoxide, butyrolacetone, tetrahydrofuran, acetonitrile and 1,2-dimethoxyethane.
6. A display device as in claim 3, wherein:
    said salt is dissolved in complex form.
7. A display device as in claim 3, wherein:
    said electrolyte includes a complex-forming agent to increase the solubility of said salt.
8. A display device as in claim 7, wherein:
    the complex-forming agent is selected from the group consisting of N,N,N',N'-tetramethyl ethylene diamine, aluminium chloride, ethylene diamine tetra acetic acid and kryptates.
9. A display device as in claim 1, wherein:
    said electrolyte is a 0.1-1 molar solution of lithium perchlorate in propylene carbonate.

* * * * *

UNITED STATES PATENT AND TRADEMARK OFFICE
CERTIFICATE OF CORRECTION

PATENT NO. : 4,059,341
DATED : November 22, 1977
INVENTOR(S) : Zeller

It is certified that error appears in the above-identified patent and that said Letters Patent are hereby corrected as shown below:

On the Cover Page, Under Section [30] Foreign Application Priority Data, please delete "5866/72" and insert therefor --5866/75--.

Signed and Sealed this

Second Day of May 1978

[SEAL]

Attest:

RUTH C. MASON
Attesting Officer

LUTRELLE F. PARKER
Acting Commissioner of Patents and Trademarks